(12) United States Patent
Lee et al.

(10) Patent No.: US 11,150,511 B2
(45) Date of Patent: Oct. 19, 2021

(54) BACKLIGHT UNIT AND DISPLAY DEVICE INCLUDING THE SAME

(71) Applicant: LG Display Co., Ltd., Seoul (KR)

(72) Inventors: YongSeok Lee, Gyeonggi-do (KR); JinRyun Kim, Gyeonggi-do (KR); YongJoong Yoon, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/992,964

(22) Filed: Aug. 13, 2020

(65) Prior Publication Data

US 2021/0055607 A1    Feb. 25, 2021

(30) Foreign Application Priority Data

Aug. 21, 2019 (KR) .......................... 10-2019-0102404

(51) Int. Cl.
*G02F 1/1335* (2006.01)
*G02F 1/13357* (2006.01)

(52) U.S. Cl.
CPC .. *G02F 1/133603* (2013.01); *G02F 1/133605* (2013.01); *G02F 1/133606* (2013.01); *G02F 1/133608* (2013.01); *G02F 1/133614* (2021.01); *G02F 2202/28* (2013.01)

(58) Field of Classification Search
None
See application file for complete search history.

(56) References Cited

U.S. PATENT DOCUMENTS

| | | | |
|---|---|---|---|
| 2015/0219955 A1* | 8/2015 | Son | G02F 1/133308 349/58 |
| 2020/0117055 A1* | 4/2020 | Kim | G02F 1/133603 |
| 2020/0285114 A1* | 9/2020 | Yamashita | G02B 6/0078 |

* cited by examiner

*Primary Examiner* — James A Dudek

(74) *Attorney, Agent, or Firm* — Birch, Stewart, Kolasch & Birch, LLP

(57) ABSTRACT

Disclosed is a backlight unit comprising an optical unit including a substrate on which a plurality of light emitting devices for irradiating light are disposed, for uniformly distributing the light emitted from the plurality of light emitting devices, a cover bottom accommodating the optical unit, and a side housing fixed to the cover bottom and disposed to overlap at least a part of an upper surface of the optical unit. A display device using the backlight unit is also provided.

18 Claims, 21 Drawing Sheets

(a)　　　　　　　　　　(b)

(a)

(b)

BACKLIGHT UNIT AND DISPLAY DEVICE INCLUDING THE SAME

CROSS REFERENCE TO RELATED APPLICATION

This application claims priority to Korean Patent Application No. 10-2019-0102404, filed in the Republic of Korea on Aug. 21, 2019, the entire contents of which are hereby expressly incorporated by reference for all purposes as if fully set forth herein into the present application.

BACKGROUND

Field

Embodiments of the present disclosure relate to a backlight unit and a display device including the same.

Discussion of the Related Art

Along with the development of the information society, a demand for display devices for displaying images is increasing rapidly in a variety of application fields. For a display device, various display devices such as, e.g., liquid crystal displays (LCDs), organic light emitting displays (OLEDs), quantum dot light emitting displays (QLEDs), and so on are recently being utilized.

A liquid crystal display (LCD) device of various flat-panel display devices typically utilizes a Light Emitting Diode (LED), a Cold Cathode Fluorescent Lamp (CCFL), a Hot Cathode Fluorescent Lamp (HCFL) and the like, as a light source for a backlight unit. In recent years, the light-emitting diodes having excellent light efficiency and better color reproducibility are in wide use as a light source for the backlight unit of a display device.

The backlight units can be classified into an edge-type, a direct-type and so on, according to the arrangement of the light sources and the transmission mode of light. In the direct-type of backlight unit, among others, the light source such as, e.g., an LED can be arranged on the back side of the display device.

BRIEF SUMMARY

Embodiments of the present disclosure provide an improved backlight unit capable of uniformly displaying the colors, and a display device using the same.

Further, embodiments of the present disclosure provide an improved backlight unit capable of implementing a thin bezel, and a display device using the same.

According to an aspect, provided is a backlight unit comprising an optical unit including a substrate on which a plurality of light emitting devices irradiating light are disposed, for uniformly distributing the light emitted from the plurality of light emitting devices, a cover bottom accommodating the optical unit, and a side housing fixed to the cover bottom and disposed to overlap at least a part of an upper surface of the optical unit.

According to another aspect, provided is a display device comprising a display panel and a backlight unit irradiating light onto the display panel, the backlight unit comprising an optical unit including a substrate on which a plurality of light emitting devices irradiating light are disposed, for uniformly distributing the light emitted from the plurality of light emitting devices, a cover bottom accommodating the optical unit, and a side housing fixed to the cover bottom and disposed to overlap at least a part of an upper surface of the optical unit.

According to the embodiments of the present disclosure, it is possible to provide a backlight unit capable of uniformly displaying the colors, and a display device using the same.

Further, according to the embodiments of the present disclosure, it is possible to provide a backlight unit capable of implementing a thin bezel, and a display device using the same.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
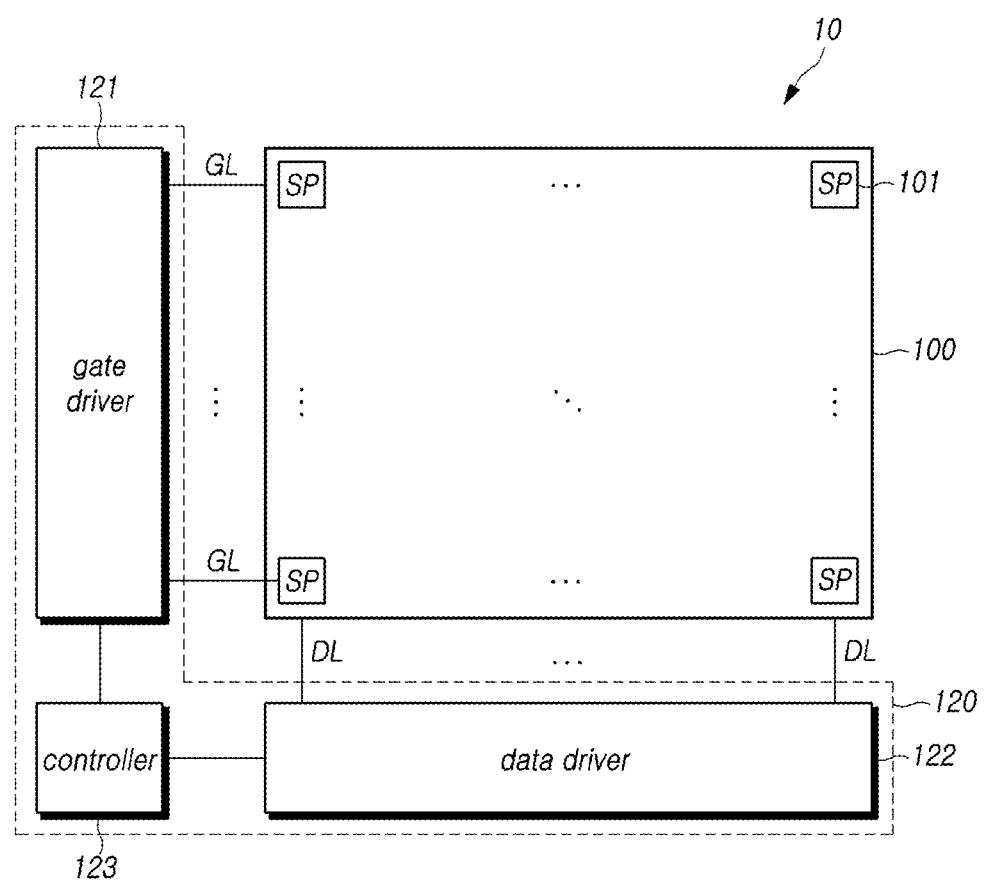
FIG. 1 is a structural diagram illustrating a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 shows a structural diagram of a display device according to embodiments of the present disclosure. All the components of the display device according to all embodiments of the present disclosure are operatively coupled and configured.

Referring to FIG. 1, a display device 10 can include a display panel 100 and a driving circuit 120 for driving the display panel 100. The display panel 100 is configured to display images, and the driving circuit 120 is configured to transmit signals and/or voltages to the display panel 100 to have the images displayed thereon. The driving circuit 120 can further include a gate driver 121, a data driver 122 and a controller 123.

The display panel 100 can include a plurality of gate lines GL and a plurality of data lines DL. The display panel 100 can include at least one subpixel SP (101) connected to the gate line GL and the data line DL. Further, in case where the display panel 100 is of a liquid crystal panel, it can include a pixel electrode, a common electrode, and a liquid crystal layer disposed between the pixel electrode and the common electrode. The liquid crystal layer is configured to display the images, by causing its molecular arrangement to change in response to voltages applied to the pixel electrode and the common electrode so as to block or transmit the light through the layer.

The gate driver 121 can make a control of the driving timing of the plurality of subpixels 101 by sequentially outputting scan signals via the plurality of gate lines GL arranged on the display panel 100. The gate driver 121 can include at least one gate driver integrated circuit (GDIC), and can be disposed on either one side or both sides of the display panel 100 according to a driving scheme in use.

Each gate driver integrated circuit (GDIC) can be connected to a bonding pad of the display panel 100 by means of Tape-Automated Bonding (TAB) or Chip-On-Glass (COG) method, or can be implemented in a Gate-In-Panel (GIP) type to be directly disposed on the display panel 100. In addition, each gate driver integrated circuit (GDIC) can be implemented using a Chip-On-Film (COF) method, in which the circuit is adapted to be mounted on a film connected to the display panel 110.

The data driver 122 is configured to receive image data from the controller 123 to convert the received image data into a series of analog data voltage. The data driver 122 is configured to output data voltages to each data line DL in line with the timing at which the scan signals are applied through the gate line GL, so that each sub-pixel 101 can represent brightness according to the image data.

The data driver 122 can include at least one source driver integrated circuit (SDIC), which source driver integrated circuit can include a shift register, a latch circuit, a digital-to-analog converter, and an output buffer, although not limited thereto.

Each source driver integrated circuit (SDIC) can be configured to be connected to a bonding pad of the display panel 100 by means of Tape Automated Bonding (TAB) or Chip-On-Glass (COG) method, or can be directly disposed on the display panel 100. Further, each source driver integrated circuit can be implemented with Chip-On-Film (COF) method, in which case each source driver integrated circuit can be mounted on a film connected to the display panel 100 and then electrically connected to the display panel 100 through wirings on the film.

The controller 123 can be configured to supply various control signals to the gate driver 121 and the data driver 122, to control the operation of the gate driver 121 and the data driver 122. The controller 123 can be mounted on a printed circuit board, and can be electrically connected to the gate driver 121 and the data driver 122 through the printed circuit board. The controller 123 can be configured to control the gate driver 121 to adaptively output the scan signal according to the operation timing to be implemented in each frame.

Further, the controller 123 can be configured to convert externally received image data in compliance with a data signal format used in the data driver 122 and then output the converted image data to the data driver 122. The controller 123 can be configured to receive from an external source (e.g., a host system) various timing signals such as e.g., a vertical sync signal VSYNC, a horizontal sync signal HSYNC, an input data enable signal DE, and a clock signal CLK, together with image data.

Then, the controller 123 can be configured to generate various control signals using the various timing signals transmitted from the outside to output the same to the gate driver 121 and the data driver 122. For example, in order to control the gate driver 121, the controller 123 can be configured to provide a variety of gate control signals GCS inclusive of e.g., a gate start pulse GSP, a gate shift clock GSC, a gate output enable signal GOE, and so on. Here, the gate start pulse GSP can be adapted to control the operation start timing of at least one gate driver integrated circuit constituting the gate driver 121.

The gate shift clock GSC can be a clock signal commonly input to at least one gate driver integrated circuit, for controlling the shift timing of the scan signal. The gate output enable signal GOE can specify the timing information of the at least one gate driver integrated circuit.

Furthermore, in order to control the data driver 122, the controller 123 can be configured to output various data control signals DCS inclusive of, e.g., a source start pulse SSP, a source sampling clock SSC, a source output enable signal SOE, and so on. Here, the source start pulse SSP can be adapted to control the data sampling start timing of one least one source driver integrated circuit constituting the data driver 122. The source sampling clock SSC can be a clock signal to control the data sampling timing in each of the source driver integrated circuit. Further, the source output enable signal SOE can be adapted to control the output timing of the data driver 122.

In addition, the driving circuit 120 can include a power management integrated circuit for supplying various voltages and/or currents to the display panel 100, the gate driver 121, the data driver 122, the controller 123 and others, or controlling those various voltages or currents to be supplied thereto.

Figure 2A:
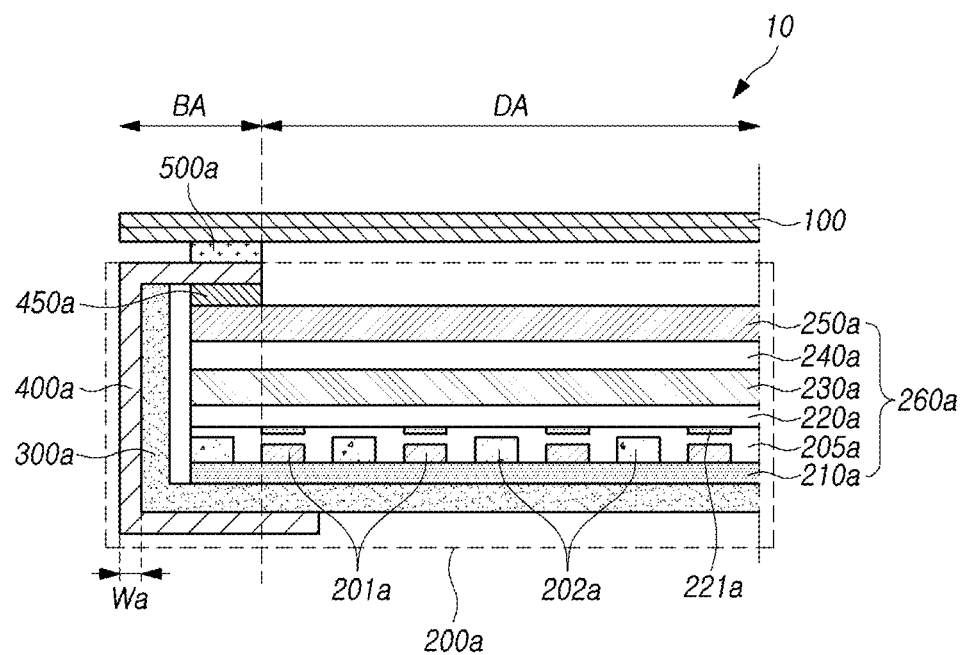
FIG. 2A is a cross-sectional view illustrating a display device according to embodiments of the present disclosure.
Figure 2B:
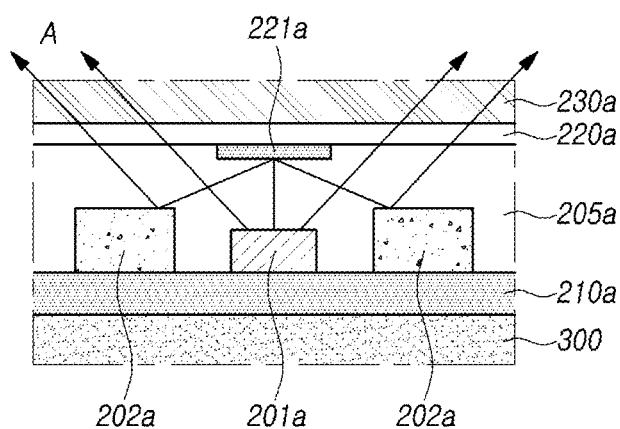
FIG. 2B is a conceptual diagram illustrating a path through which the light travels in the display device illustrated in FIG. 2A.

FIG. 2A shows a cross-sectional view of a display device according to embodiments of the present disclosure, and FIG. 2B is a schematic conceptual diagram showing the path through which the light travels in the display device illustrated in FIG. 2A.

Referring first to FIG. 2A, the display device 10 can include a display area DA and a bezel area BA. The bezel area BA can be disposed around a rim or edge portion of the display area DA. Further, the display device 10 can include a display panel 100 and a backlight unit 200a.

The display panel 100 is configured to display images. When the display panel 100 is of a liquid crystal panel, the display panel 100 can include a liquid crystal and a color filter.

The backlight unit 200a can be configured to irradiate light onto the display panel 100. Further, the backlight unit 200a can include an optical unit 260a including a plurality of light emitting devices 201a irradiating light and a substrate 210a on which the plurality of light emitting devices 201a are disposed, for uniformly distributing the light irradiated from the plurality of light emitting devices 201a, a cover bottom 300a accommodating the optical unit 260a, and a side housing 400a fixed to the cover bottom 300a and disposed to overlap at least a part of an upper surface of the optical unit 260a.

The substrate 210a can be a printed circuit board. The plurality of light emitting devices 201a disposed on the substrate 210a can be adapted to emit light in a blue wavelength band, although not limited thereto. The light emitting device 201a can include a light emitting diode (LED). The light emitting device 201a can be a small-sized mini light emitting diode (Mini LED) or a very small-sized micro light emitting diode (μLED). Further, the light emitting device 201a can be disposed in a form of being mounted on the substrate 210a in a chip-shaped flip-chip structure. Such a light emitting device 201a of the flip-chip structure makes it possible to reduce the thickness of the backlight unit 200, providing a light source with wider irradiation angle and higher light efficiency. Further, at least one reflective plate 202a can be disposed on the substrate 210a. The reflector 202a can include a plurality of holes, and a plurality of light emitting devices 201a can be disposed between the reflector 202a.

The substrate 210a can be disposed on the upper surface of the cover bottom 300a, although it is not limited thereto, and the substrate 210a can be disposed on a sidewall of the cover bottom 300a.

A light source protection layer 205a having a predetermined thickness can be disposed on the substrate 210a on which the light emitting devices 201a and the reflectors 202a are disposed. The light source protection layer 205a can serve to protect the light emitting devices 201a, and can cause diffusion of light emitted from the light emitting device 201a to provide a function as a light guide plate. The light emitted from the light emitting device 201a can spread up to the upper surface of the light source protection layer 205a as most evenly as possible. The light source protection layer 205a can be a resin layer including resin.

Further, a light conversion sheet 220a can be disposed over the substrate 210a, or the light conversion sheet 220a can be disposed on the light source protection layer 205a. As shown in FIG. 2B, the light conversion sheet 220a can cause scattering, reflection, or diffraction of part of the light incident from the light emitting device 201a. In addition, the light conversion sheet 220a can cause transmission of part of the light irradiated from the light emitting device 201a. The light conversion sheet 220a can include a plurality of light conversion patterns 221a. Each light conversion pattern 221a can be disposed at a position at least partially overlapping the region where the light emitting device 201a is disposed.

The light conversion pattern 221a is configured to cause scattering, reflection, and/or diffraction of part of the light irradiated from each light emitting device 201a. Further, the light conversion pattern 221a is configured to transmit part of the light emitted from the light emitting device 201a. More specifically, the light conversion pattern 221a is configured to be arranged in an area having the strongest intensity of the light emitted from the light emitting device 201a in the light conversion sheet 220a, and thus, it is possible to reduce the luminance deviation between the area in which the light emitting device 201a is disposed (i.e., an area having a relatively large amount of light) and the area between the light emitting devices 201a (i.e., an area having a relatively small amount of light). The light conversion sheet 220a can include a light conversion material. Further, the light conversion pattern 221a of the light conversion sheet 220a can include such a light conversion material as well. Furthermore, the light conversion material can include titanium dioxide (TiO2). In addition, the light conversion material can be of white color, although it is not limited thereto.

The backlight unit 200a can include a diffusion plate 230a. The diffusion plate 230a can cause diffusion of the incident light that is emitted from the light emitting device 201a. The diffusion plate 230a can be disposed on the light conversion sheet 220a. The diffusion plate 230a can include polystyrene or polycarbonate. Further, the diffusion plate 230a can include glass. Furthermore, the plurality of light conversion patterns 221a can be disposed adjacent to the light source protection layer 205a or disposed adjacent to the diffusion plate 230a.

The backlight unit 200a can further include a color conversion sheet 240a, which color conversion sheet 240a can be disposed on the diffusion plate 230a. The color conversion sheet 240a can cause excitation of the blue light emitted from the light emitting device 201a to emit white light. The color conversion sheet 240a can include a phosphor.

Further, the backlight unit 200a can further include an optical sheet 250a, which can be disposed on the color conversion sheet 240a. The optical sheet 250a can cause collection or diffusion of the incident light to be transmitted to the display panel 100. The optical sheet 250a can include a light collection sheet and a diffusion sheet.

In the backlight unit 200a, the optical unit 260a can include the substrate 210a, the light conversion sheet 220a, the diffusion plate 230a, the color conversion sheet 240a, and the light diffusion sheet 250a disposed on the substrate 210a. The optical unit 260a can be accommodated in the cover bottom 300a. The optical unit 260a can be configured to uniformly distribute the light irradiated from the plurality of light emitting devices 201a and provide the light to the display panel 100.

The side housing 400a can be disposed to overlap at least a part of the upper surface of the substrate 210a and fixed to the cover bottom 300a. The area in which the upper side of the side housing 400a and the outer surface portion of the substrate 210a overlap each other can correspond to the bezel area BA. The side housing 400a can be fixed by bonding to the cover bottom 300a. The side housing 400a can be disposed to cover part of an upper surface of the substrate 210a, an outer side wall of the cover bottom 300a, and part of a lower surface of the cover bottom 300a, as shown in FIG. 2A. When the diffusion plate 230a, the color conversion sheet 240a, and the optical sheet 250a are stacked on the upper surface of the substrate 210a, the side housing 400a can be disposed to cover part of the upper portion of the optical sheet 250a.

The side housing 400a can be configured to have a thickness of 0.1-0.2T, so that even if the side housing 400a is disposed to cover the side wall of the cover bottom 300a, the width Wa of the side housing 400a does not make a thickness of a rim part of the backlight unit 200a increase significantly, thereby making it possible to embody the bezel area BA thin. Further, in order to make the bezel region BA thin, a portion of the side housing 400a overlapping the upper surface of the substrate 210a can be implemented in thin width.

Then, a part of the light reflected, scattered, or diffracted via the light conversion sheet 220a can be adapted to travel in a first path A progressing in a substantially horizontal direction of the backlight unit 200a as shown in FIG. 2B. Further, the light in the first path A can be reflected by a structure including the side housing 400a disposed in the rim part of the backlight unit 200a and then proceed in the direction toward the display panel 100.

At this juncture, so-called mura can be generated at the rim part of the backlight unit 200a. When the width of the portion overlapping the upper surface of the substrate 210a of the side housing 400a is increased, an area covering the rim part of the backlight unit 200a is increased, so as to fully cover the region where such a mura appears. However, there can be often a problem that it becomes very difficult to implement the thin bezel region BA.

Therefore, as described above, in order to reduce the mura and implement the thinner bezel area BA as well, the backlight unit 200a can further include a light conversion unit 450a. The light conversion unit 450a can be disposed over the light conversion sheet 220a in a position overlapping the side housing 400a. The light conversion unit 450a can have a predetermined thickness and can include a phosphor. Further, the light conversion unit 450a can include a plastic body coated with a phosphor. The phosphor included in the light conversion unit 450a can be substantially the same as the phosphor included in the color conversion sheet 240a.

The plastic body can be coated with a white pigment, and a phosphor can be coated on the coated white pigment. Further, the plastic body can be transparent and the transparent plastic body can be coated with a phosphor, wherein the plastic body can be PET (polyethylene terephthalate), although not limited thereto.

The light conversion unit 450a can cause reflection of light of the first path A underneath the side housing 400a. When the light is reflected by the light conversion unit 450a, the light can be excited to convert blue light into white light. Therefore, it is possible to suppress the occurrence of mura on the rim part of the backlight unit 200a. Thus, such an arrangement of the light conversion unit 450a makes it possible to implement a thin width of the portion where the side housing 400a and a part of the optical unit 260a overlap each other, so that the thin bezel area BA can be implemented efficiently.

Further, the side housing 400a can be configured to support the display panel 100 disposed on the top of the backlight unit 200a. A foam pad 500a can be disposed between the side housing 400a and the display panel 100.

Figure 3:
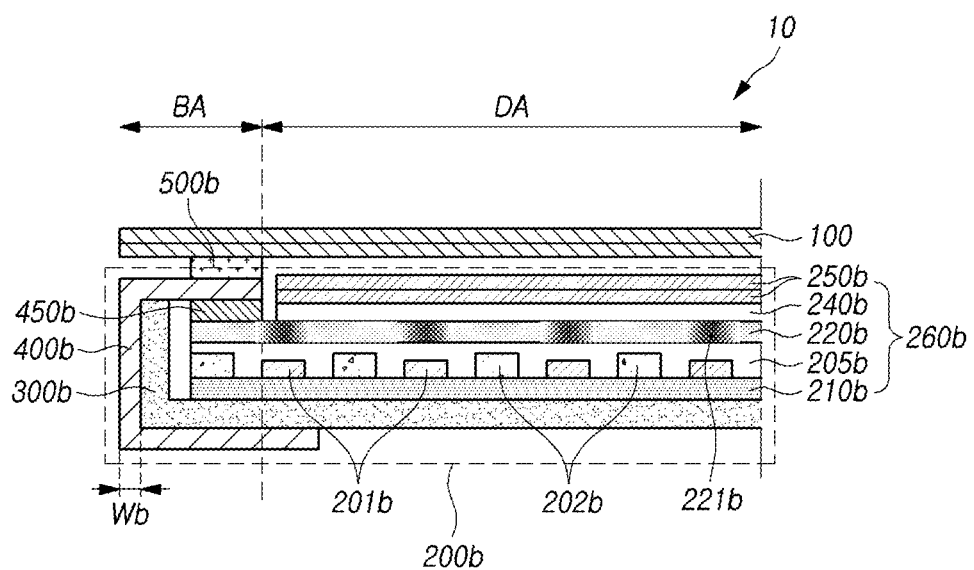
FIG. 3 is a cross-sectional view illustrating a display device according to embodiments of the present disclosure.

FIG. 3 shows a cross-sectional view of a display device according to embodiments of the present disclosure.

Referring to FIG. 3, the display device 10 can include a display area DA and a bezel area BA. The bezel area BA can be disposed around a rim or edge portion of the display area DA. Further, the display device 10 can include a display panel 100 and a backlight unit 200b.

The display panel 100 is configured to display images. When the display panel 100 is of a liquid crystal panel, the display panel 100 can include a liquid crystal and a color filter.

The backlight unit 200b can be configured to irradiate light onto the display panel 100. Further, the backlight unit 200b can include an optical unit 260b including a plurality of light emitting devices 201b irradiating light and a substrate 210b on which the plurality of light emitting devices 201b are disposed, for uniformly distributing the light irradiated from the plurality of light emitting devices 201b, a cover bottom 300b accommodating the optical unit 260b, and a side housing 400b fixed to the cover bottom 300b and disposed to overlap at least a part of an upper surface of the optical unit 260b.

The substrate 210b can be a printed circuit board. The plurality of light emitting devices 201b disposed on the substrate 210b can be adapted to emit light in a blue wavelength band, although it is not limited thereto. The light emitting device 201b can include a light emitting diode (LED). The light emitting device 201b can be a small-sized mini light emitting diode (Mini LED) or a very small-sized micro light emitting diode (PLED). Further, the light emitting device 201b can be disposed in a form of being mounted on the substrate 210b in a chip-shaped flip-chip structure. Such a light emitting device 201b of the flip-chip structure makes it possible to reduce the thickness of the backlight unit 200b providing a light source with wider irradiation angle and higher light efficiency. Further, at least one reflective plate 202b can be disposed on the substrate 210b. The reflector 202b can include a plurality of holes, and a plurality of light emitting devices 201b can be disposed between the reflector 202b.

The substrate 210b can be disposed on the upper surface of the cover bottom 300b, although not limited thereto, and alternatively, the substrate 210b can be disposed on a sidewall of the cover bottom 300b.

A light source protection layer 205b having a predetermined thickness can be disposed on the substrate 210b on which the light emitting devices 201b and the reflectors 202b are arranged. The light source protection layer 205b serves to protect the light emitting devices 201b, and can cause diffusion of light emitted from the light emitting device 201b to provide a function as a light guide plate. The light emitted from the light emitting device 201b can spread up to the upper surface of the light source protection layer 205b as more evenly as possible. The light source protection layer 205b can be a resin layer including resin.

Further, a light conversion sheet 220b can be disposed over the substrate 210b, or the light conversion sheet 220a can be disposed on the light source protection layer 205b. The light conversion sheet 220b can cause scattering, reflection, or diffraction of part of the incident light emitted from the light emitting device 201b. Further, the light conversion sheet 220b can cause transmission of part of the light irradiated from the light emitting device 201b. Further, such diffraction of the light irradiated from the light emitting device 201b makes it possible to reduce the luminance deviation between the area in which the light emitting device is disposed (i.e., an area having a relatively large amount of light) and the area between the light emitting devices (i.e., an area having a relatively small amount of light). The light conversion sheet 220b can include a plurality of light conversion patterns 221b. Each light conversion pattern 221b can be disposed at a position at least partially overlapping the region where the light emitting device 201b is disposed.

The light conversion pattern 221b is configured to cause scattering, reflection, and/or diffraction of part of the light irradiated from each light emitting device 201b. Further, the light conversion pattern 221b is configured to transmit part of the light irradiated from the light emitting device 201b. More specifically, by making the light conversion pattern 221b arranged in an area having the strongest intensity of the light emitted from the light emitting device 201b in the light conversion sheet 220b, it is possible to reduce the luminance deviation between the area in which the light emitting device 201b is disposed (i.e., an area having a relatively large amount of light) and the area between the light emitting devices 201b (i.e., an area having a relatively small amount of light). The light conversion sheet 220b can include a light conversion material. Further, the light conversion pattern 221b of the light conversion sheet 220b can include such a light conversion material as well. Furthermore, the light conversion material can include titanium dioxide (TiO2). In addition, the light conversion material can be of white color, although it is not limited thereto.

The backlight unit 200 can include a color conversion sheet 240b. The color conversion sheet 240b can be disposed on a diffusion plate 217. The color conversion sheet 240b can cause excitation of blue light emitted from the light emitting device 201b to emit white light. The color conversion sheet 240b can include a phosphor. Further, a plurality of light conversion patterns 221b can be disposed adjacent to the light source protection layer 205b or adjacent to the color conversion sheet 240b.

Further, the backlight unit 200 can include an optical sheet 250b, which can be disposed on the color conversion sheet 240b. The optical sheet 250a can cause collection or diffusion of the incident light to be transmitted to the display panel 100b. The optical sheet 250b can include a light collection sheet and a diffusion sheet.

In the backlight unit 200b, a portion at least inclusive of the substrate 210b and the light conversion sheet 220b can be referred to as an optical unit 260b, although not limited thereto. The optical unit 260b can be accommodated in a cover bottom 300b. The optical unit 260b can be configured to uniformly distribute the light irradiated from the plurality of light emitting devices 201b and provide the light to the display panel 100.

The side housing 400b can be disposed to overlap at least a part of the upper surface of the substrate 210b and fixed to the cover bottom 300b. The side housing 400a can be fixed by bonding to the cover bottom 300a. The area in which the upper side surface of the side housing 400b and the outer surface portion of the substrate 210b overlap each other can correspond to the bezel area BA. The side housing 400b can be disposed to cover part of the upper surface of the substrate 210b, an outer side wall of the cover bottom 300b, and part of the lower surface of the cover bottom 300b. Further, the side housing 400b can be disposed in a position corresponding to part of the upper surface of the light conversion sheet 220b, a side wall of the cover bottom 300b, and the lower surface of the cover bottom 300b.

The side housing 400b can be configured to have a thickness of 0.1 to 0.2T, so that even if the side housing 400b is disposed to cover the side wall of the cover bottom 300b, the width Wb of the side housing 400b does not cause the thickness of a rim part of the backlight unit 200b to increase significantly. Thus, this arrangement will make it possible to embody a thin bezel area BA. The thickness of the side housing 400b is not limited to the aforementioned. Further, in order to make the bezel region BA thin, a light conversion unit 450b can be disposed in a portion of the side housing 400b overlapping the upper surface of the substrate 210b, so that the width of the portion in which the side housing 400b overlaps the upper surface of the optical unit 260b can be implemented in a relatively thin width.

Thus, the backlight unit 200b can further include the light conversion unit 450b disposed at a position where the substrate 210b and the side housing 400b overlap each other on the substrate 210b. The light conversion unit 450b can have a predetermined thickness and can include a phosphor. Further, the light conversion unit 450b can include a plastic body coated with a phosphor. The phosphor included in the light conversion unit 450b can be substantially the same as the phosphor included in the color conversion sheet 240b.

Preferably, the plastic body can be coated with a white pigment, and a phosphor can be coated on the coated white pigment. Further, the plastic body can be transparent and the transparent plastic body can be coated with a phosphor, wherein the plastic body can be formed of PET (polyethylene terephthalate), although not limited thereto.

This light conversion unit 450b makes it possible to suppress the occurrence of the so-called mura on the rim or edge portion of the backlight unit 200b. Therefore, by arranging the light conversion unit 450b as described above, the width of the portion where the upper surface of the side housing 400b overlaps part of the upper surface of the optical unit 260b can be implemented thin, so that the bezel area BA can be implemented thin accordingly.

In addition, the side housing 400b can be configured to support the display panel 100b disposed on its upper side. Then, a foam pad 500b can be disposed between the side housing 400b and the display panel 100b.

Although FIGS. 2A and 3 each show the arrangement of the backlight units 200a and 200b in which the light emitting devices 201a and 201b are disposed in a position facing a rear surface of the display panel 100, such an arrangement of the light emitting devices 201a and 201b is not limited thereto, and those light emitting devices 201a and 201b can be disposed on the side surface of the backlight units 200a and 200b as occasion demands.

Figure 4:
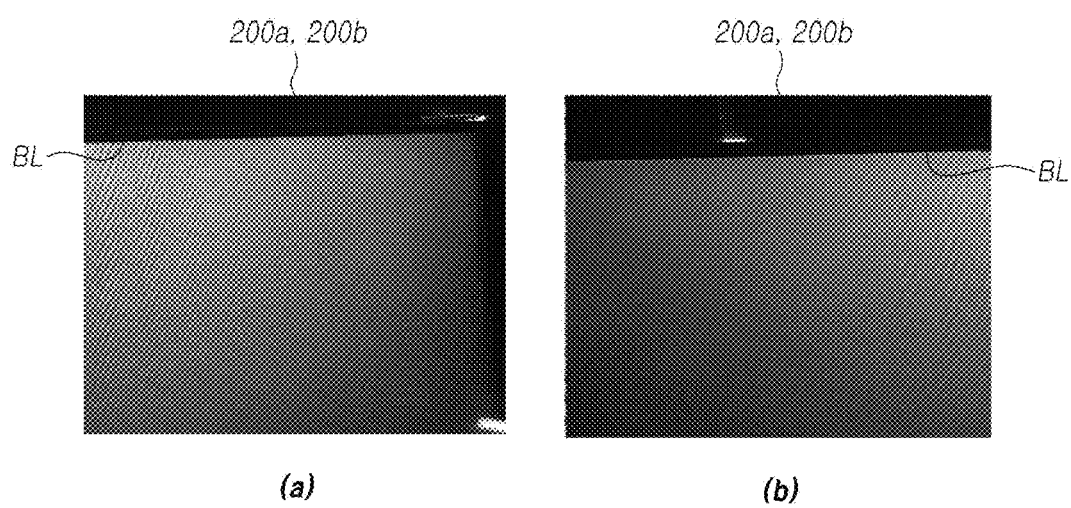
FIG. 4 is a plan view illustrating a displayed status when light is being irradiated from a backlight unit according to the present disclosure.

FIG. 4 shows a plan view illustrating that the light is irradiated from the backlight unit according to the present disclosure.

Referring to FIG. 4, the view (a) shows a case where the light conversion units 450a and 450b are not included in the backlight units 200a and 200b, and the view (b) shows a case where the light conversion units 450a and 450b are included in the backlight units 200a and 200b.

As seen in the view (a), a blue bright line can be shown in a boundary BL of the backlight units 200a and 200b. On the other hand, as seen in the view (b), such a bright line does not appear in the boundary BL of the backlight units 200a and 200b so that the boundary is displayed more clearly. Accordingly, it can be seen that when the light conversion units 450a and 450b are included in the backlight units 200a and 200b, the backlight units 200a and 200b can express colors more uniformly. Further, it can be seen that occurrence of mura is more suppressed in the backlight units 200a and 200b shown in the view (b) rather than the backlight units 200a and 200b shown in the view (a).

Figure 5:
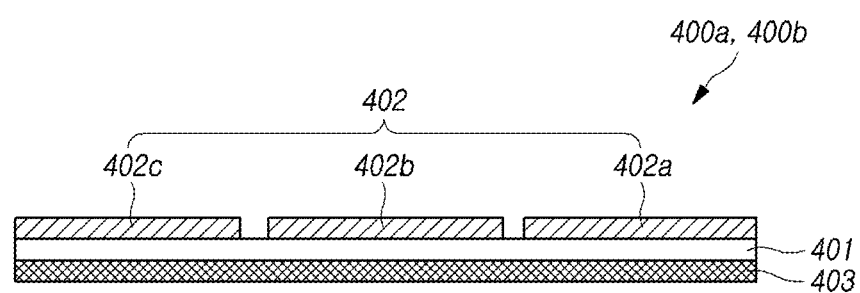
FIG. 5 is a cross-sectional view showing a side housing according to embodiments of the present disclosure.
Figure 6:
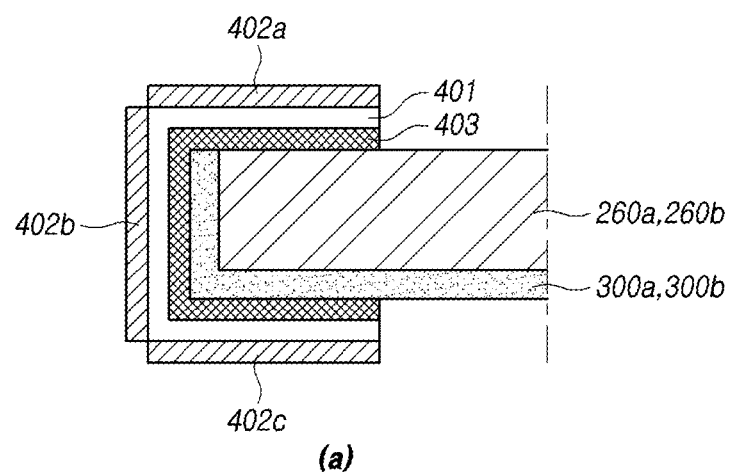
FIG. 6 is a view showing that the side housing according to embodiments of the present disclosure is fixed to the backlight unit.
Figure 6:
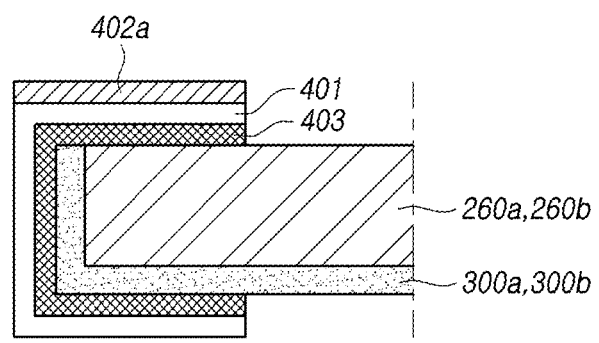

FIG. 5 is a cross-sectional view showing the side housing in the embodiments of the present disclosure, and FIG. 6 is a schematic cross-sectional view showing that the side housing according to the embodiments of the present disclosure is fixed to the backlight unit.

Referring then to FIG. 5, the side housings 400a and 400b can include an aluminum film 401. The aluminum film 401 included in the side housings 400a and 400b has a predetermined level of rigidity, so it will require some external force to be unfolded from a bent state. Thus, once the side housings 400a and 400b are bent to cover at least a part of the upper surfaces of the light conversion sheets 220a and 220b and the substrates 210a and 210b and then fixed to the cover bottoms 300a and 300b, the shape of the side housings 400a and 400b will not get easily deformed. The side housings 400a and 400b can have an adhesive 403 disposed on its one surface. The side housings 400a and 400b can be formed of metal banding tapes.

Further, the side housings 400a and 400b can be provided with a rigid stiffener 402 on the opposite side of the surface where the adhesive 403 of the aluminum film 401 is disposed. Such a rigid stiffener 402 is used to reinforce the rigidity of the aluminum film 401. The rigid stiffener 402 can be SUS, although not limited thereto.

The rigid stiffener 402 can be configured to be split into at least two parts on the aluminum film 401. In case where the rigid stiffener 402 is divided into three parts 402a, 402b, 402c as shown in FIG. 5, one stiffener 402a of those stiffeners can be disposed to overlap the upper surface of the optical units 260a and 260b, and another one 402b disposed to overlap the sidewall of the cover bottoms 300a and 300b, and the other 402c disposed to overlap the bottom surface of the cover bottoms 300a and 300b, as shown in (a) of FIG. 6. For example, the rigid stiffener 402 can be disposed on at least a portion of one surface of the side housings 400a and 400b, overlapping the upper surface of the substrates 210a and 210b.

If the rigid stiffener 402 is not split into pieces, too much force will be required to bend the side housings 400a and 400b, which can often result in a problem of reduced work efficiency. The rigid stiffener 402 can protect the backlight units 200a and 200b from any external impact.

Further, the rigid stiffener 402 can be disposed only on a part of the side housings 400a and 400b. As shown in (b) of FIG. 6, the rigid stiffener 402a can be disposed in a position that the optical units 260a and 260b overlap the side housings 400a and 400b. The side housings 400a and 400b can be fixed to the cover bottoms 300a and 300b by the adhesive 403. Further, the light conversion units 450a and 450b can be fixed between the side housings 400a and 400b and the optical units 260a and 260b by the adhesive 403.

Here, although it is illustrated that the side housings 400a and 400b each are in direct contact with the top surfaces of the optical units 260a and 260b, the arrangement is not limited thereto, and the light conversion unit 450a and 450b each can be disposed between the side housings 400a and 400b and the top surfaces of the optical unit 260a and 260b.

Figure 7:
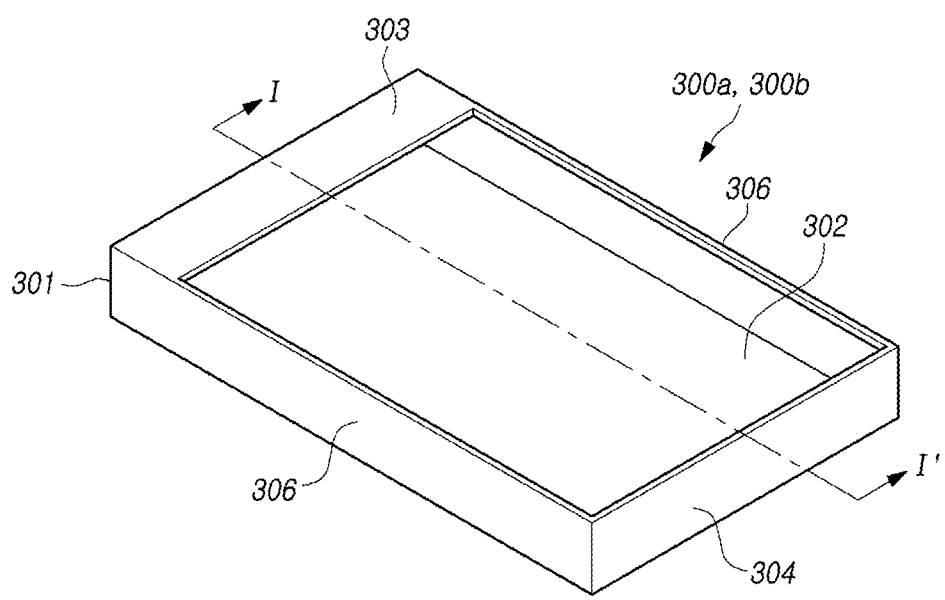
FIG. 7 is a perspective view showing a cover bottom according to embodiments of the present disclosure.

FIG. 7 shows a perspective view of the cover bottom according to embodiments of the present disclosure, and FIGS. 8A, 8B, 8C and 8D show schematic conceptual diagrams for explaining the process by which the optical unit is fastened to the cover bottom.

Referring then FIG. 7 and FIGS. 8A, 8B, 8C and 8D, the cover bottoms 300a and 300b each can be arranged to include a first side 301 and a second side 304 facing the first side 301, the first side 301 being provided with a top surface 303 disposed to be partially overlapped with a portion of a bottom surface 302 of the cover bottoms 300a and 300b, while the second side 304 being not provided with such a top surface 303 disposed to be partially overlapped with the bottom surface 302 of the cover bottoms 300a and 300b. Further, the cover bottoms 300a and 300b each can include a third side 305 connecting the first side 301 and the second side 304, and a fourth side 306 facing the third side 305, wherein the third side 305 and the fourth side 306 can be disposed not to overlap the entire bottom surface 302 of the cover bottoms 300a and 300b.

Figure 8A:
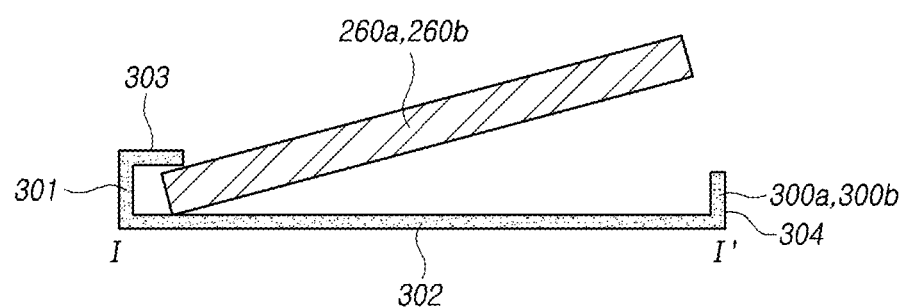
FIGS. 8A, 8B, 8C, and 8D are conceptual views illustrating a process in which an optical unit is fastened to a cover bottom according to embodiments of the present disclosure.
Figure 8B:
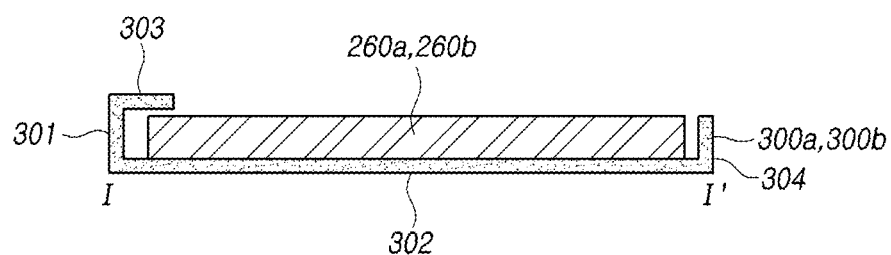
Figure 8C:
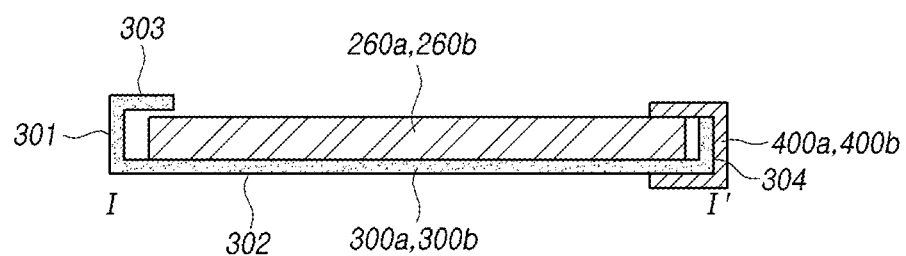

Further, the optical units 260a and 260b can be accommodated in the cover bottoms 300a and 300b. When the optical units 260a and 260b are mounted in the cover bottoms 300a and 300b, the optical units 260a and 260b are inserted at a slight tilt toward the first side 301 of the cover bottoms 300a and 300b as shown in FIG. 8A and then, the optical units 260a and 260b are pushed in to be seated horizontally within the cover bottoms 300a and 300b as shown in FIG. 8B. In addition, as illustrated in FIG. 8C, the side housings 400a and 400b can be fixed to the second side 304 of the cover bottoms 300a and 300b, and the side housings 400a and 400b can be fixed to the third side 305 and the fourth side 306 of the cover bottoms 300a and 300b as well. Then, the light conversion units 450a and 450b can be disposed on the top surface 303 of the cover bottoms 300a and 300b.

Figure 8D:
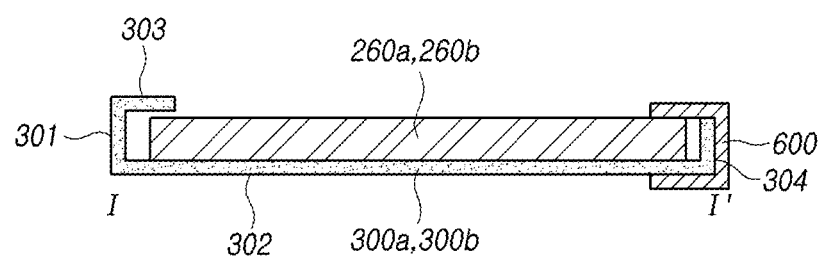

Further, as shown in FIG. 8D, a clip 600 can be used to be fastened to the second side 304 of the cover bottoms 300a and 300b. Further, the side housings 400a and 400b can be fixed to the third side 305 and the fourth side 306 of the cover bottoms 300a and 300b. Then, the light conversion units 450a and 450b can be disposed on an upper surface of the clip 600 where the second side 304 of the cover bottom 300a and 300b overlaps part of the bottom surface 302 of the cover bottom 300a and 300b. The side housings 400a and 400b are not disposed in the second side 304 of the cover bottoms 300a and 300b, although the arrangement is not limited thereto.

Figure 9:
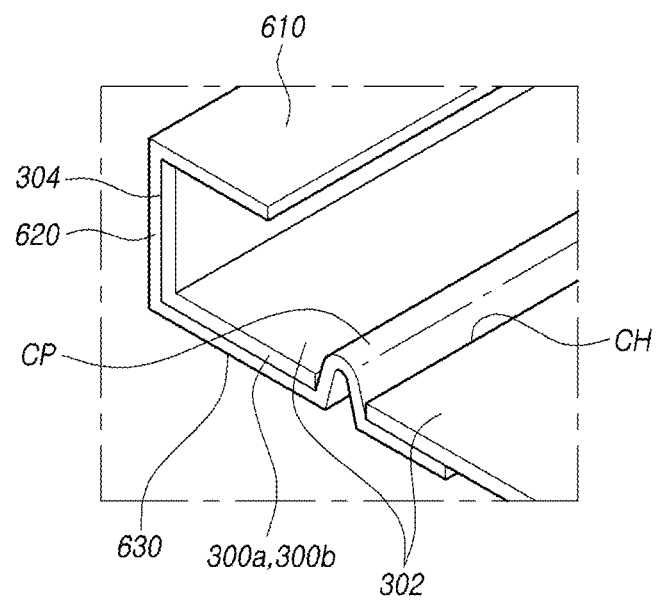
FIG. 9 is a schematic view showing the cover bottom and a clip fastened to the cover bottom according to an example of the present disclosure.

FIG. 9 shows a schematic structure of the cover bottom and the clip fastened to the cover bottom according to the present disclosure.

Referring then to FIG. 9, a hole CH can be formed in the bottom surface 302 adjacent to the second side 304 of the cover bottoms 300a and 300b. Further, the clip 600 can include a top surface 610 disposed to partially overlap the bottom surface 302 of the cover bottoms 300a and 300b, a side surface 620 disposed corresponding to the second side 304 of the cover bottoms 300a and 300b, and a bottom surface 630 in which a protrusion CP fastened to the hole CH formed in the bottom surface 302 of the cover bottoms 300a and 300b are disposed. Then, when the side wall 620 comes into close contact with the second side 304 of the cover bottoms 300a and 300b, with the protrusion CP of the clip 600 being inserted into the hole CH from the outside of the cover bottoms 300a and 300b, the clip 600 can be fastened to the cover bottoms 300a and 300b.

FIGS. 10A to 10E are schematic diagrams illustrating a detailed structure of the backlight unit according to embodiments of the present disclosure.

Figure 10A:
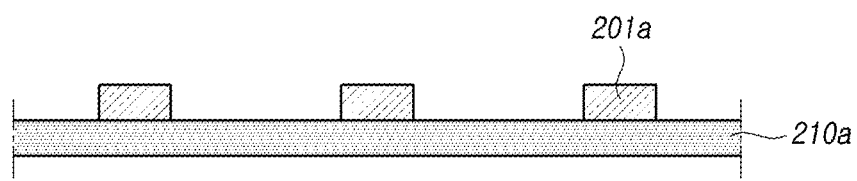
FIGS. 10A, 10B, 10C, 10D, and 10E each are schematic diagrams illustrating a detailed structure of the backlight unit according to embodiments of the present disclosure.

Referring first to FIG. 10A, a plurality of light emitting devices 201a can be disposed on the substrate 210a. A coated reflective film can be disposed on the substrate 210a, and the coated reflective film can be of a white pigment. For example, a white pigment can be applied onto the substrate 210a.

Figure 10B:
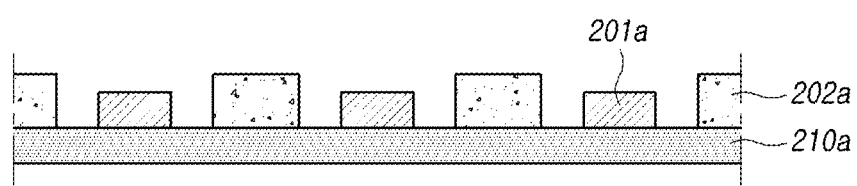

Referring then to FIG. 10B, it is shown that at least one reflector 202a can be disposed on at least a part of an area other than the area in which the light emitting devices 201a are disposed on the substrate 210a.

This reflector 202a can be manufactured in a shape in which an area corresponding to the light emitting device 201a is opened and then, can be disposed to be seated on the substrate 210a. Further, the reflector 202a can cause reflection of the light emitted from the light emitting device 201a onto the entire front surface of the backlight unit 200a, thereby increasing the light efficiency of the backlight unit 200a.

Here, when the light emitting device 201a is disposed in the form of a chip, the size of the light emitting device 201a becomes relatively smaller, so the height of the reflector 202a can be higher than that of the light emitting device 201a.

Then, the light emitted from a side surface of the light emitting device 201a can be reflected off a side surface of the reflector 202a to be output onto the entire surface of the backlight unit 200a, thereby further enhancing the light efficiency of the backlight unit 200a.

Figure 10C:
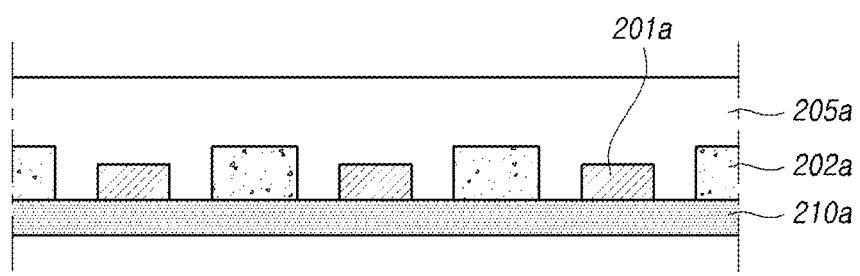

Referring then to FIG. 10C, a light source protection layer 205a can be disposed on the plurality of light emitting devices 201a and the reflectors 202a, wherein the light source protection layer 205 can include resin. When depositing the light source protection layer 205, a partition wall can be disposed in the outer part of the substrate 210a or an outermost portion of the area where the plurality of light emitting devices 201a are disposed on the substrate 210a, and the resin can be then coated on the inner side of the partition wall, so that the light source protection layer 205a can be disposed over the plurality of light emitting devices 201a and the reflectors 202a.

The resin layer 205a can serve to protect the plurality of light emitting devices 201a disposed on the substrate 210a, and can provide a function as a light guide plate by causing diffusion of the light emitted from the light emitting devices 201a. Thus, the light emitted from the light emitting device 201a can be spread over the upper surface of the light source protection layer 205a as more evenly as possible. At this point, even though an adjustment can be made to the direction in which the light spreads out throughout the light source protection layer 205a by the reflector 202a, the intensity of the light emitted out from the light source protection layer 205 through an area corresponding to the vertical direction of the light emitting device 201a can be larger than that of the light emitted out through any other areas. Therefore, it can inevitably result in significant deterioration of luminance uniformity in the light emitted from the backlight unit 200a.

According to the embodiments of the present disclosure, it is possible to improve the luminance uniformity of displayed image while reducing the thickness of the backlight unit 200a, by allowing the light conversion sheet 220a with the optical characteristics to be disposed in the position corresponding to the light emitting device 201a on the light source protection layer 205a.

Figure 10D:
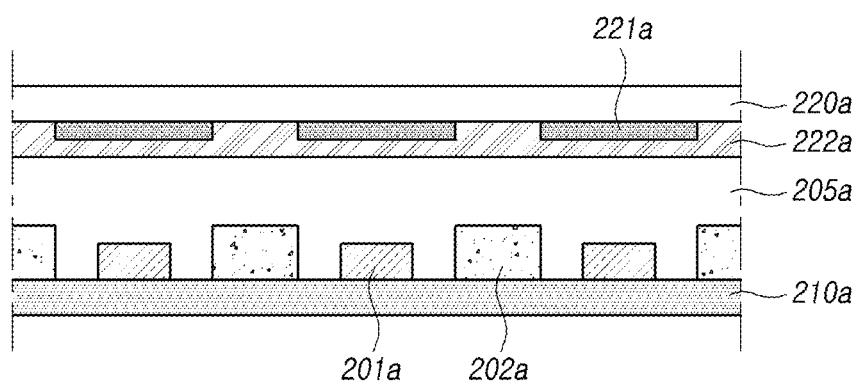

Referring then to FIG. 10D, it is seen that the light conversion sheet 220a can be disposed above the light source protection layer 205, and the light conversion sheet 220a can include a plurality of light conversion patterns 221a disposed on its bottom surface. However, the arrangement is not limited thereto, and the plurality of light conversion patterns 221a can be disposed on a top surface of the light conversion sheet 220a as circumstances arise. Then, the light conversion sheet 220a can be bonded onto the light source protection layer 205a by means of an adhesive film 222a. The adhesive film 222a can be an optical clear adhesive (OCA) film. Further, the light conversion sheet 220a can be formed of, for example, PET or the like, although it is not limited thereto.

Each of the plurality of light conversion patterns 221a disposed on the bottom surface of the light conversion sheet 220a can be arranged in a position corresponding to each of the plurality of light emitting devices 201a disposed on the substrate 210a. For example, at least a portion of the light conversion pattern 221a can be disposed to overlap the light emitting device 201a. As such, when considering the diffusion characteristics of light, the light conversion pattern 221a can be disposed to overlap an area including the area where the light emitting device 201a is disposed.

The light conversion pattern 221a allows the light emitted from the light emitting device 201a to undergo scattering, reflection, diffraction and/or transmission. For example, the light conversion pattern 221a can cause scattering of the light emitted from the light emitting device 201a, thereby enabling to output the light both in the vertical direction and in the oblique direction. Further, causing to undergo reflection of the light emitted from the light emitting device 201a and then, causing again to undergo reflection by the reflector 202a will make it possible to output the light through an area between the light emitting devices 201a.

As described above, the light emitted from the light emitting device 201a can be caused to undergo scattering, reflection, diffraction and/or transmission by the light conversion pattern 216p, so that the luminance uniformity of the backlight unit 200a can be remarkably enhanced. Further, the light conversion pattern 221a makes it possible to adjust the direction of emission of the light emitted from the light emitting device 201a in its vertical direction.

Figure 10E:
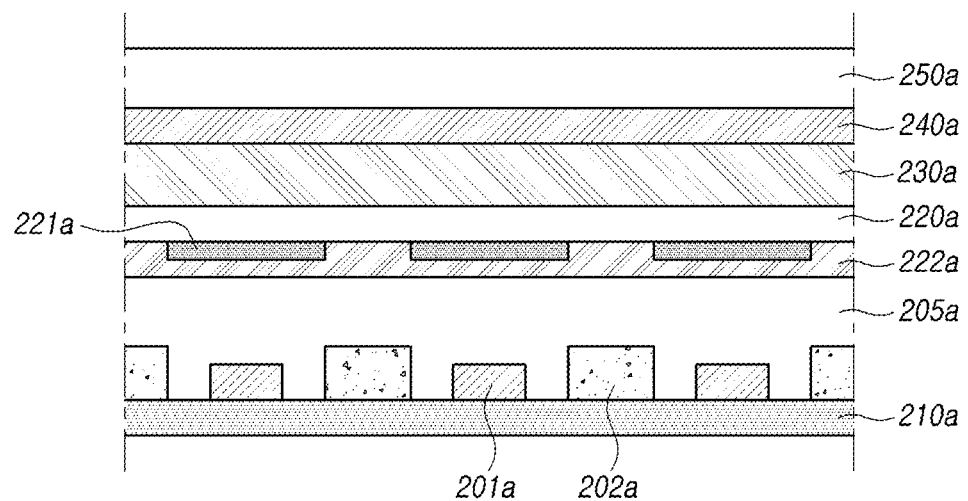

Referring then to FIG. 10E, a diffuser plate 230a can be disposed on the light conversion sheet 220a, and a color conversion sheet 240a can be disposed on the diffuser plate 230a, wherein the diffuser plate can be of a phosphor film. Further, at least one optical sheet 220 can be disposed on the color conversion sheet 240a. Here, the diffuser plate 230a and the color conversion sheet 240a can be disposed interchangeably with each other.

The diffuser plate 230a can cause diffusion of the light emitted through the light conversion sheet 220a. The color conversion sheet 240a can include a phosphor material with a specific color, and cause excitation of the incident light to emit a specific wavelength band of light. For this reason, the light passing through the color conversion sheet 240a can be of a specific color included in the color conversion sheet 240a or a color mixed with the specific color. As an example, when the light emitting device 201a is adapted to emit a first wavelength band of light (e.g., blue light), the color conversion sheet 240a can react to the incident light to emit a second wavelength band of light (e.g., green light) and/or a third wavelength band of light (e.g., red light).

Further, the color conversion sheet 240a can be disposed in some area on the diffuser plate 230a as circumstances require. For example, when the light emitting device 201a is adapted to give off the blue wavelength band of light, the color conversion sheet 240a can be disposed only in some other area except for an area corresponding to the area in which the blue color subpixel is disposed in the display panel 100. In other words, an arrangement can be made in such a manner that the light that has not passed through the color conversion sheet 240a reaches the blue color of sub-pixel of the display panel 100.

Further, the color conversion sheet 240a may not be disposed over the light emitting device 201a according to the type of the light emitting device 201a in use. For example, the color conversion sheet 240a may not be disposed over the light emitting device 201a, in case where the light emitting device 201a is adapted to emit the light in white wavelength band, or a color conversion film for emitting the light in green wavelength band and the light in red wavelength band is coated on the emission surface of the light emitting device 201a emitting the light in blue wavelength band.

As described heretofore, the backlight unit 200a can be configured to include the light conversion sheet 220a with the light conversion patterns 221a disposed in the position corresponding to the light emitting device 201a, and other various optical elements, thereby making it possible to improve the luminance uniformity of the light presented by the backlight unit 200 while implementing a reduced thickness of the backlight unit 200a.

Figure 11:
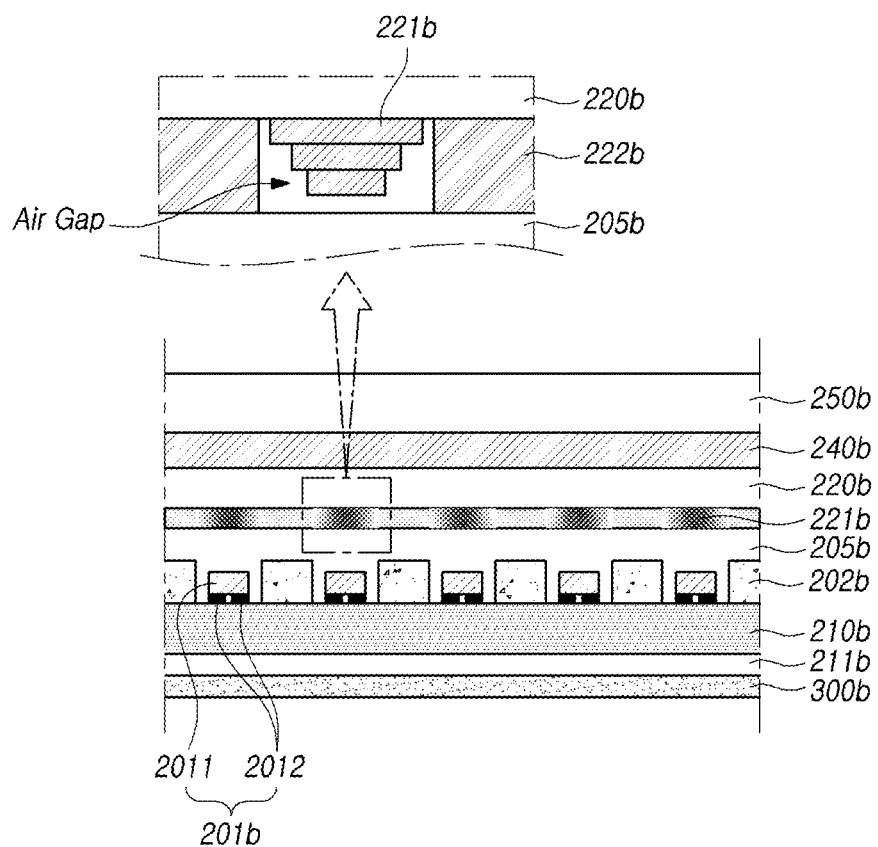
FIG. 11 is a schematic diagram showing the structure of the backlight unit according to embodiments of the present disclosure.

FIG. 11 is a schematic diagram showing the structure of the backlight unit according to the embodiments of the present disclosure.

Referring to FIG. 11, a substrate 210b can be disposed on a cover bottom 300b. The cover bottom 300b can be fixed onto the substrate 210b by means of an adhesive tape 211b disposed between the substrate 210a and the cover bottom 300b. However, it is to be noted that the arrangement of the cover bottom 300b is not limited thereto, and it can be fixed to the substrate 210b by means of screws.

A plurality of light emitting devices 201b can be disposed on the substrate 210b, and at least one reflector 202b can be disposed in at least a part of an area other than the area in which the light emitting devices 201b are disposed.

Here, the light emitting device 201b can be, for example, a light emitting diode (LED), which can further include a light emitting section 2011 having an n-type semiconductor layer, an activation layer and a p-type semiconductor layer, and an electrode section 2012. A light source protection layer 205b can be disposed on the plurality of light emitting devices 201b and the reflectors 202b. A light conversion sheet 220b having thereon a light conversion pattern 221b can be disposed in a position corresponding to the light emitting device 201b on the light source protection layer 205b. Further, on the light conversion sheet 220b can be disposed a light conversion sheet 240b, an optical sheet 220 and others.

The light conversion pattern 221b disposed on the bottom surface of the light conversion sheet 220b can be implemented by having a certain material with specific light conversion characteristics printed on the light conversion sheet 220b, preferably, for example, printing a certain pattern of ink inclusive of $TiO_2$ on the light conversion sheet 220b. Further, the light conversion pattern 221b disposed on the bottom surface of the light conversion sheet 220b can be formed either of one layer or in a multi-layer structure. Although FIG. 11 illustrates that the light conversion pattern 221b can be formed of, for instance, three layers, the number of the pattern layers constituting the light conversion pattern 221b is not limited thereto. When the light conversion pattern 221b includes such three layers, the light conversion pattern 221b can be implemented using the method of printing the light conversion material at least three times on the light conversion sheet 220b.

Meanwhile, since the intensity of light emitted from the light emitting device 201b has the largest in its vertical direction, the central portion of the light conversion pattern 221b can be formed with thicker depth than any other peripheral portion thereof. That is to say, the area of the printed light conversion material can be formed to have less area (i.e., narrower) as it goes further to a next printing sequence, although not limited thereto. Thus, the area of the light conversion pattern 221b can be formed narrower as it goes further downwards from the light conversion sheet 220b, and thus, the thickness in the central portion of the light conversion pattern 221b can be greater than that in its outer portion. Further, the light conversion sheet 220b including the light conversion pattern 221b can be disposed such that the light conversion pattern 221b is adjacent to the light source protection layer 205b. Further, the light conversion sheet 220b including the light conversion pattern 221b can be disposed adjacent to the color conversion sheet 240b. For example, the light conversion pattern 221b can be disposed on the top surface of the light conversion sheet 216.

With the light conversion pattern 221b disposed over the light emitting device 201, it makes it possible to block the light output in a vertical direction from the light emitting device 201, thereby preventing formation of a hot spot in an area in which the light emitting devices 201 of the backlight unit 200 are disposed. The light conversion sheet 220b provided thereon with the light conversion pattern 221b can be bonded to the light source protection layer 205 by means of an adhesive film 222b. Here, the adhesive film 222b can be disposed on at least some of an area other than the area where the light conversion pattern 221b is disposed, on the bottom surface of the light conversion sheet 220b.

Then, the adhesive film 222b may not be disposed in the area where the light conversion pattern 221b is disposed, and an air gap can exist in between the light conversion pattern 221b and the light source protection layer 205b. Further, the sides of the light conversion patterns 221b can be respectively arranged to be spaced apart from the adhesive film 222b. As the air gap exists between the light conversion pattern 221b and the light source protection layer 205b, the light emitted in the lateral direction of the light conversion pattern 221b can be reflected by the air gap. That is to say, the light output in the lateral direction of the light conversion pattern 221b can be output at a large refractive angle by the air gap having a low refractive index or be reflected off the air gap. Then, the light reflected off the air gap is caused to undergo reflection again by the reflector 202b and then output therefrom, thereby further increasing the light efficiency of the backlight unit, while assisting the light conversion function of the light conversion pattern 221b.

As described above, it is possible to increase the light efficiency of the backlight unit while preventing formation of hot spots, owing to the structure that allows the light conversion pattern 221b and the air gap to be arranged in the position corresponding to the light emitting device 201. Meanwhile, the light conversion patterns 221b disposed underneath the light conversion sheet 220b can be arranged in a different structure according to their disclosed positions.

Figure 12A:
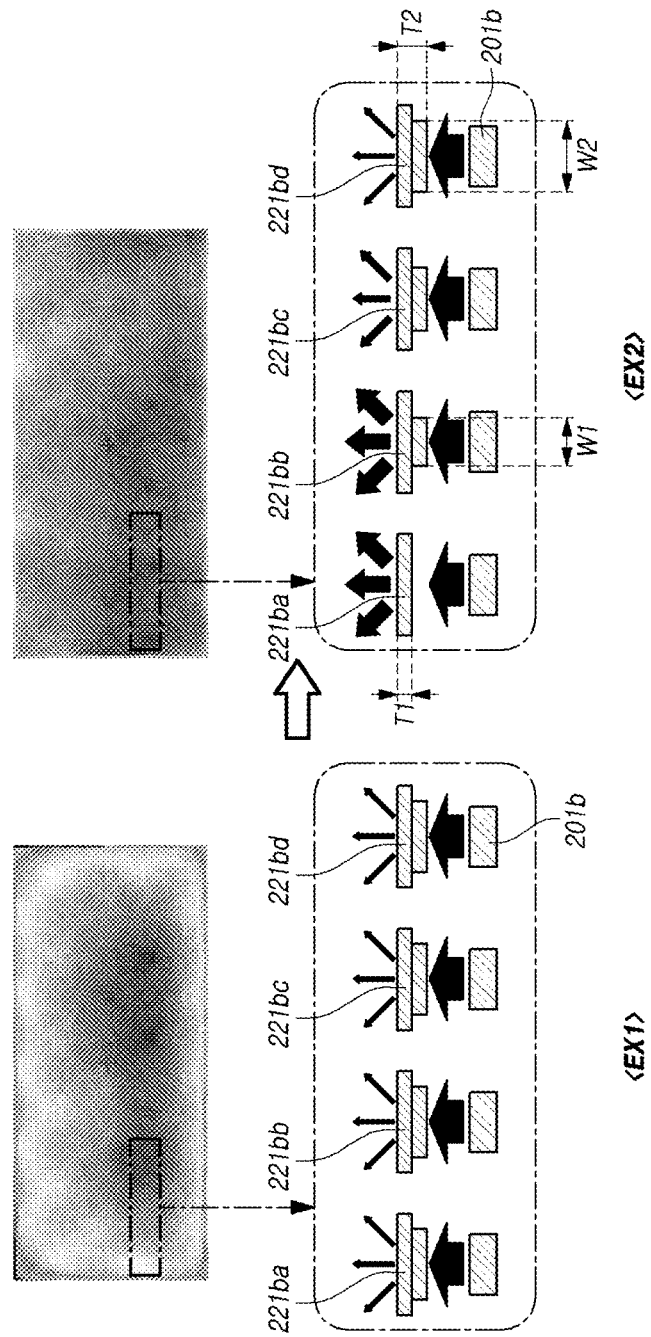
FIGS. 12A and 12B each are schematic diagrams illustrating examples of the structure according to the disposed position of light conversion patterns included in the backlight unit shown in FIG. 11.
Figure 12B:
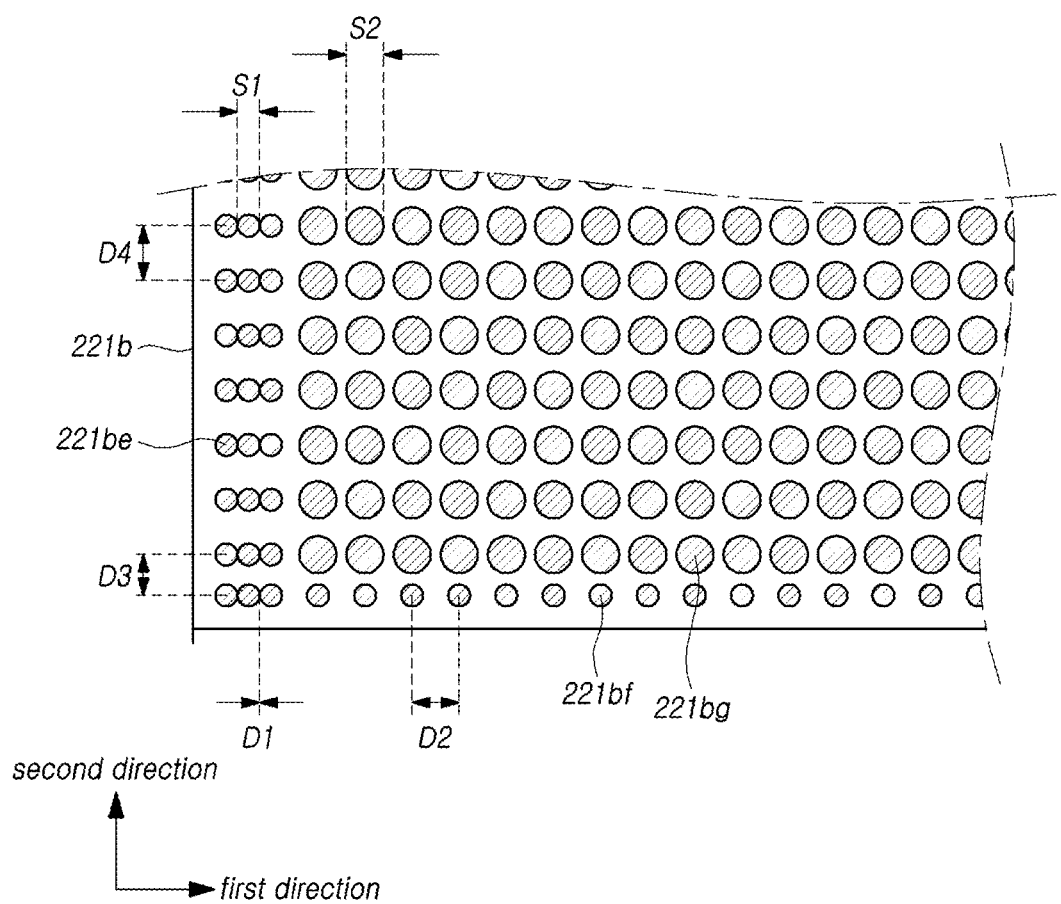

FIGS. 12A and 12B each illustrate an example of the structure according to the arrangement positions of the light conversion patterns included in the backlight unit as illustrated in FIG. 11.

Referring first to FIG. 12A illustrating examples of the luminance presented via the backlight unit 200b according to the structure of the light conversion pattern 221b, it is seen that the example <EX1> represents the luminance measured when the light conversion patterns 221b are arranged in a regular pattern of structure, whereas the example <EX2> represents the luminance measured when the light conversion patterns 221b are arranged in a different pattern of structure according to their disposed positions.

As seen in the example <EX1> of FIG. 12A, the luminance in the outer area of the backlight unit 200a can appear lower, when the light conversion pattern 221ba disposed in the outer area of the backlight unit 200 and the light conversion pattern 216bd disposed in its central area are substantially the same as each other in their structures.

In other words, as the outer area of the backlight unit 200b has a relatively small number of the light emitting devices 201b supplying light the corresponding outer area, the luminance in the outer area of the backlight unit 200b can get lower than that in the central area of the backlight unit 200b in case where the light conversion patterns 221 having the same level of light conversion characteristics are arranged thereon.

Therefore, as seen in the example <EX2> of FIG. 12A, by making the light conversion pattern 221ba in the outer area of the backlight unit 200b arranged in a different structure from the light conversion pattern 221ba in the central area thereof, it is possible to prevent the luminance in the outer area of the backlight unit 200b from deteriorating and thus, make its overall luminance uniform.

As an example, the light conversion patterns 221b can be arranged so that the thickness T1 of the light conversion pattern 221ba disposed in the outer area of the backlight unit 200b is less than the thickness T2 of the light conversion pattern 221bd disposed in its central area.

Alternatively, the light conversion patterns 221b can be arranged so that the area W1 of the thickest portion in the light conversion pattern 221bb disposed adjacent to the outer area of the backlight unit 200b is smaller than the area W2 of the thickest portion in the light conversion pattern 221bd. In other words, the light conversion patterns 221b can be arranged so that the portion having higher blocking characteristics in the light conversion patterns 221ba and 221bb disposed in the outer area of the backlight unit 200b or an area adjacent to the outer area has a smaller area.

Further, the light conversion patterns 221b can be arranged so that as it goes further from the center area to the outer area of the backlight unit 200b, the thickness of the light conversion pattern 221b or the area of the thickest portion in the light conversion pattern 221b gradually decreases.

Furthermore, the arrangement can be made so that the distance between light emitting devices 201b or the number of the light emitting devices 201b in the central area and the outer area of the backlight unit 200b can be different from each other as circumstances require, and thus, the light conversion patterns 221b can be arranged in a different pattern from each other.

Referring then to FIG. 12B, it is shown another example of the structure in which the light conversion patterns 221b are disposed on a bottom surface of the light conversion sheet 220b.

Here, the distance between the light emitting devices 201b disposed in the outer area of the backlight unit 200b can be narrower than the distance between the light emitting devices 201b disposed in the central area of the backlight unit 200b. In other words, the light emitting devices 201b can be arranged in a more dense structure for the outer area of the backlight unit 200b, so that the luminance in both the central area and the outer area of the backlight unit 200b becomes uniform.

Then, as the light conversion patterns 221b disposed on the bottom surface of the light conversion sheet 220b are arranged in a position corresponding to the light emitting device 201b, the distance between the light conversion patterns 221b disposed in the outer area of the backlight unit 200b can be different from that between the light conversion patterns 221b disposed in the central area thereof.

As an example, the distance D1 in the first direction of the light conversion patterns 221b disposed in the outer area of the backlight unit 200b can be smaller than the distance D2 in the first direction of the light conversion patterns 221b disposed in the central area thereof. Further, the distance D3 in the second direction of the light conversion patterns 221b disposed in the outer area of the backlight unit 200b can be smaller than the distance D4 in the second direction of the light conversion patterns 221b disposed in the central area thereof.

Here, the size and the thickness of the light conversion patterns 221b disposed in the outer area of the backlight unit 200b can be different from those of the light conversion pattern 221b disposed in the central area of the backlight unit 200b.

For example, as illustrated in FIG. 12B, the size S1 of the light conversion patterns 221be and 221bf disposed in the outer area of the backlight unit 200b can be smaller than the size S2 of the light conversion pattern 221bg disposed in the central area of the backlight unit.

Furthermore, the light conversion patterns 221b can have a multi-layer structure as described above, wherein the thickness of the light conversion patterns 221be and 221bf disposed in the outer area of the backlight unit or the area of its thickest section can be smaller than the thickness of the light conversion pattern 221bg disposed in the central area of the backlight unit 200b or the area of its thickest section.

In other words, it is possible to arrange the light conversion patterns 221be and 221bf in line with the light emitting devices 201b disposed in a narrow spacing, by making smaller the size of the light conversion patterns 221be and 221bf disposed in the outer area of the backlight unit 200b. Therefore, it makes it possible to prevent formation of a hot spot at the position corresponding to the light emitting devices 201b in the outer area of the backlight unit 200b.

Moreover, the light conversion pattern 221b makes it possible to reduce a blocked level of the light emitted from the light emitting device 201b in the outer area of the backlight unit 200b, thereby increasing the amount of light emission and preventing the luminance in the outer area of the backlight unit 200b from deteriorating, thus enabling presentation of more uniform luminance over an entire area of the backlight unit 200b.

As described above, it is possible to prevent the luminance from deteriorating in the outer area of the backlight unit 200b, so as to greatly improve the luminance uniformity, owing to arranging the structure of the light conversion pattern 221b in a different pattern for each corresponding area of the backlight unit 200b.

Furthermore, it is possible to prevent occurrence of hot spots in the backlight unit 200b as well as improve its luminance uniformity, using the particular arrangement structure of the light conversion patterns 221b as described above.

As a result, according to the embodiments of the present disclosure, it is possible to improve the luminance uniformity in the backlight unit 200b and thus provide a solution to enhance the light efficiency, by causing the light output in the vertical direction of the light emitting device 201b to undergo diffraction through the light conversion patterns 221b.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A backlight unit comprising:
   an optical unit including a substrate on which a reflector including a plurality of holes and a plurality of light emitting devices for irradiating light are disposed, the optical unit configured to uniformly distribute the light emitted from the plurality of light emitting devices, wherein the plurality of light emitting devices are disposed in the plurality of holes, respectively;
   a cover bottom accommodating the optical unit; and
   a side housing fixed to the cover bottom and disposed to overlap at least a part of an upper surface of the optical unit,
   wherein the optical unit further comprises a light conversion sheet disposed over the substrate and including at least one light conversion pattern, the at least one light conversion pattern is overlapped with a corresponding light emitting device among the plurality of light emitting devices, and the at least one light conversion pattern is not overlapped with the reflector, and
   wherein the at least one light conversion pattern is configured to cause scattering, reflection or diffraction of part of the light irradiated from one or more of the plurality of light emitting devices.

2. The backlight unit according to claim 1, wherein the optical unit further comprises:
   a color conversion sheet disposed on the light conversion sheet, and
   a diffusion plate disposed between the light conversion sheet and the color conversion sneer.

3. The backlight unit according to claim 1, further comprising a light conversion unit disposed in a position where the optical unit and the side housing overlap each other, on the optical unit.

4. The backlight unit according to claim 3, wherein the light conversion unit includes a plastic body coated with phosphor.

5. The backlight unit according to claim 1, wherein a rigid stiffener is disposed on one surface of the side housing, and an adhesive is disposed on the opposite side of the one surface of the side housing.

6. The backlight unit according to claim 5, wherein the rigid stiffener is disposed on a portion of one surface of the side housing that overlaps an upper surface of the optical unit.

7. The backlight unit according to claim 1, wherein a first side of the cover bottom is disposed in contact with an upper surface disposed to overlap a part of a bottom surface of the cover bottom,
   a second side facing the first side is arranged not to overlap the bottom surface of the cover bottom, and
   the side housing is fixed to the cover bottom at a position where the second side is arranged.

8. The backlight unit according to claim 1, wherein a first side of the cover bottom is arranged in contact with an upper surface disposed to overlap a part of a bottom surface of the cover bottom,
   a clip is fastened to a second side facing the first side, and
   the side housing is fixed to the cover bottom between a third side connecting the first side and the second side and a fourth side facing the third side.

9. The backlight unit according to claim 2, wherein the at least one light conversion pattern is arranged adjacent to a light source protection layer or adjacent to the diffusion plate or the color conversion sheet.

10. A display device comprising:
    a display panel; and
    a backlight unit configured to irradiate light onto the display panel, the backlight unit comprising:
       an optical unit including a substrate on which a reflector including a plurality of holes and a plurality of light emitting devices for irradiating light are disposed, the optical unit configured to uniformly distribute the light emitted from the plurality of light emitting devices, wherein the plurality of light emitting devices are disposed in the plurality of holes, respectively;
       a cover bottom accommodating the optical unit; and
       a side housing fixed to the cover bottom and disposed to overlap at least a part of an upper surface of the optical unit,
    wherein the optical unit further comprises a light conversion sheet disposed over the substrate and including at least one light conversion pattern, the at least one light conversion pattern is overlapped with a corresponding light emitting device among the plurality of light emitting devices, and the at least one light conversion pattern is not overlapped with the reflector, and
    wherein the at least one light conversion pattern is configured to cause scattering, reflection or diffraction of part of the light irradiated from one or more of the plurality of light emitting devices.

11. The display device according to claim 10, wherein the optical unit further comprises:
a color conversion sheet disposed on the light conversion sheet, and
a diffusion plate disposed between the light conversion sheet and the color conversion sheet.

12. The display device according to claim 10, further comprising a light conversion unit disposed in a position where the optical unit and the side housing overlap each other, on the optical unit.

13. The display device according to claim 12, wherein the light conversion unit includes a plastic body coated with phosphor.

14. The display device according to claim 10, wherein a rigid stiffener is disposed on one surface of the side housing, and an adhesive is disposed on the opposite surface of the one surface of the side housing.

15. The display device according to claim 14, wherein the rigid stiffener is disposed on a portion of one surface of the side housing that overlaps an upper surface of the optical unit.

16. The display device according to claim 10, wherein a first side of the cover bottom is arranged in contact with of an upper surface disposed to overlap a part of a bottom surface of the cover bottom,
a second side facing the first side is arranged not to overlap the bottom surface of the cover bottom, and
the side housing is fixed to the cover bottom at a position where the second side is arranged.

17. The display device according to claim 10, wherein a first side of the cover bottom is arranged in contact with an upper surface disposed to overlap a part of a bottom surface of the cover bottom,
a clip is fastened to a second side facing the first side, and
the side housing is fixed to the cover bottom between a third side connecting the first side and the second side and a fourth side facing the third side.

18. The display device according to claim 11, wherein the at least one light conversion pattern is arranged adjacent to a light source protection layer or adjacent to the diffusion plate or the color conversion sheet.

* * * * *